No. 762,195. PATENTED JUNE 7, 1904.
W. C. RENIE.
SAW SWAGING MACHINE.
APPLICATION FILED NOV. 15, 1902.
NO MODEL. 4 SHEETS—SHEET 4.
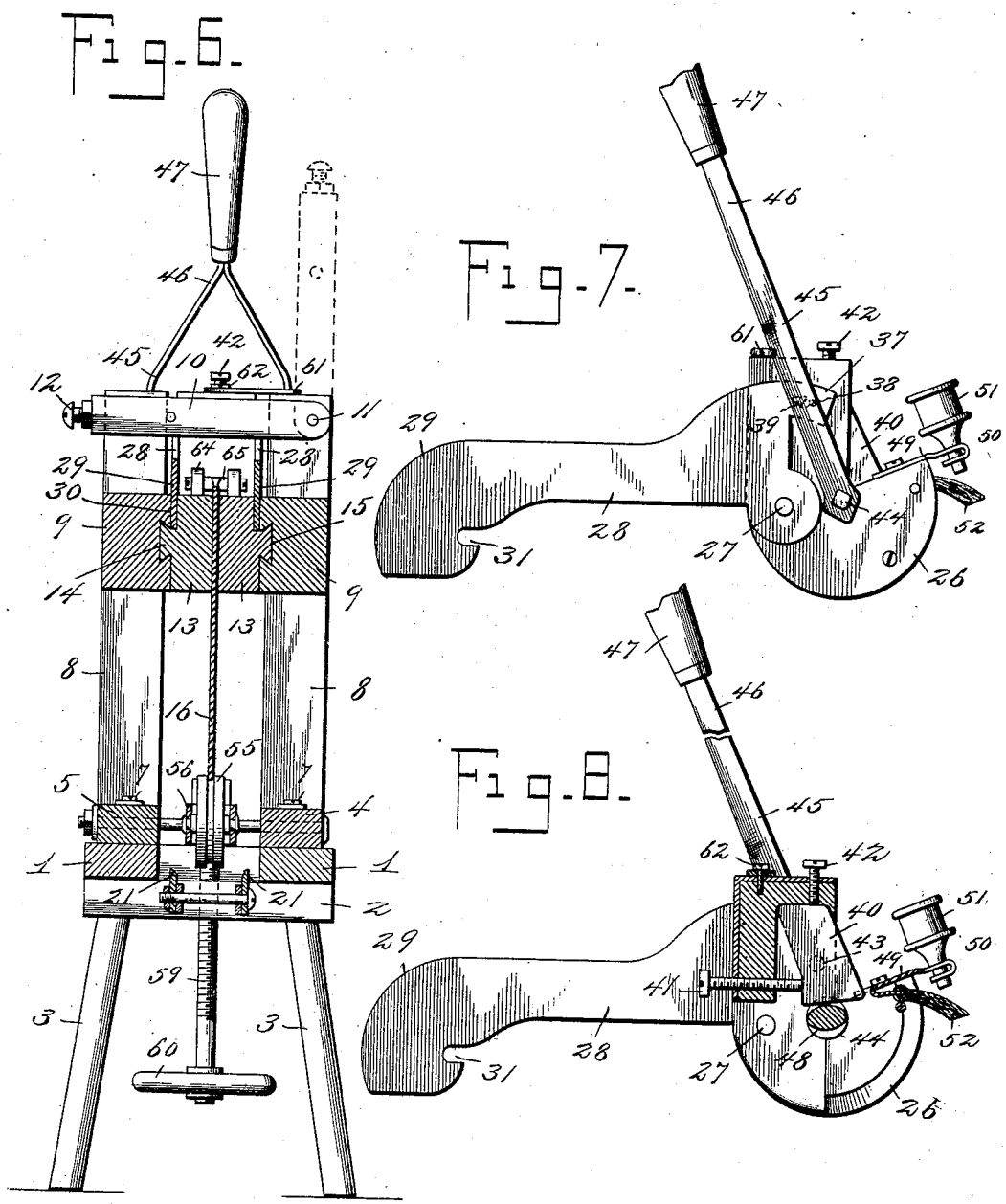
Witnesses
Harry L. Amer.
Chas. S. Hyer.
Inventor
William C. Renie.
By Victor J. Evans
Attorney No. 762,195. Patented June 7, 1904.

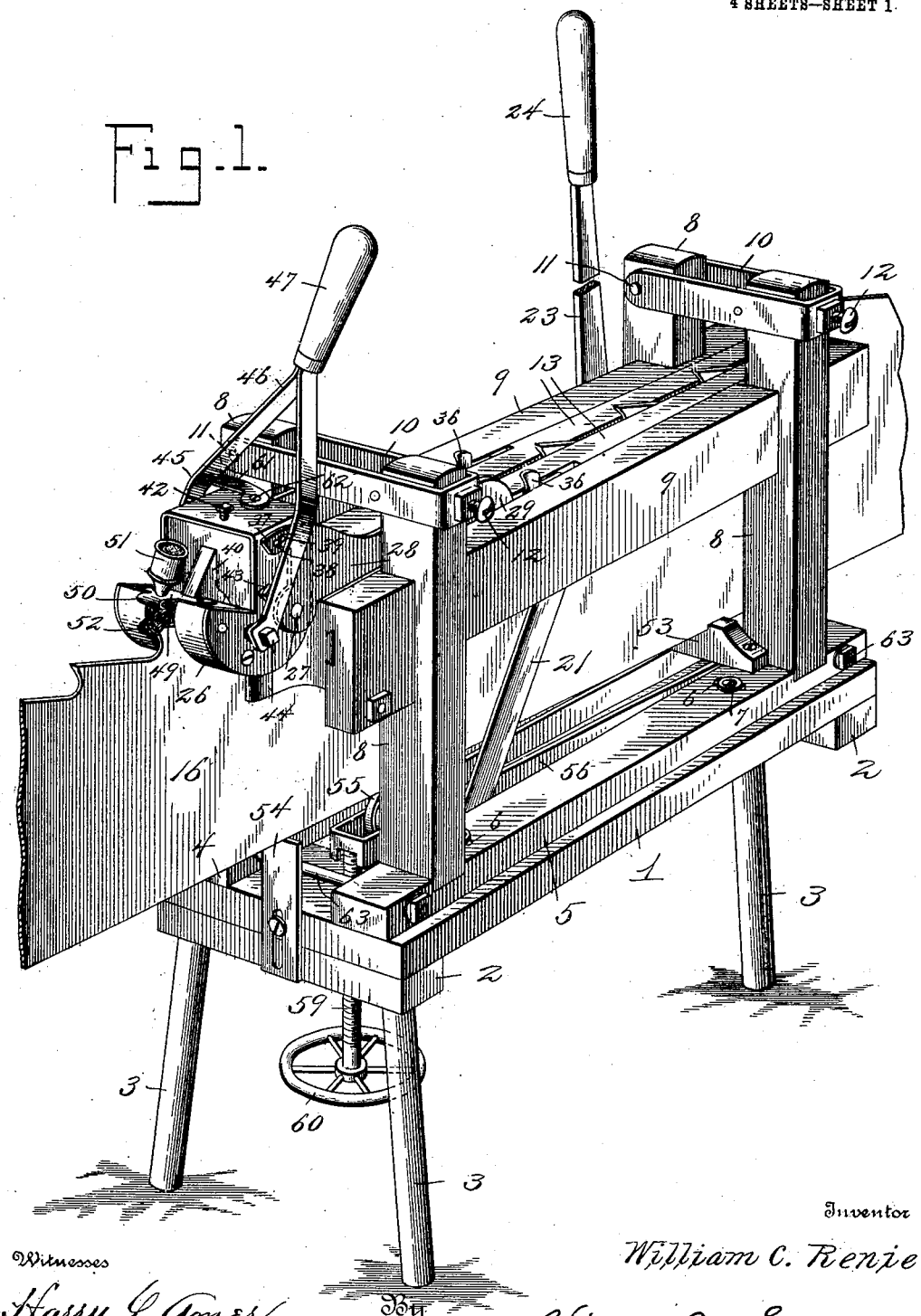

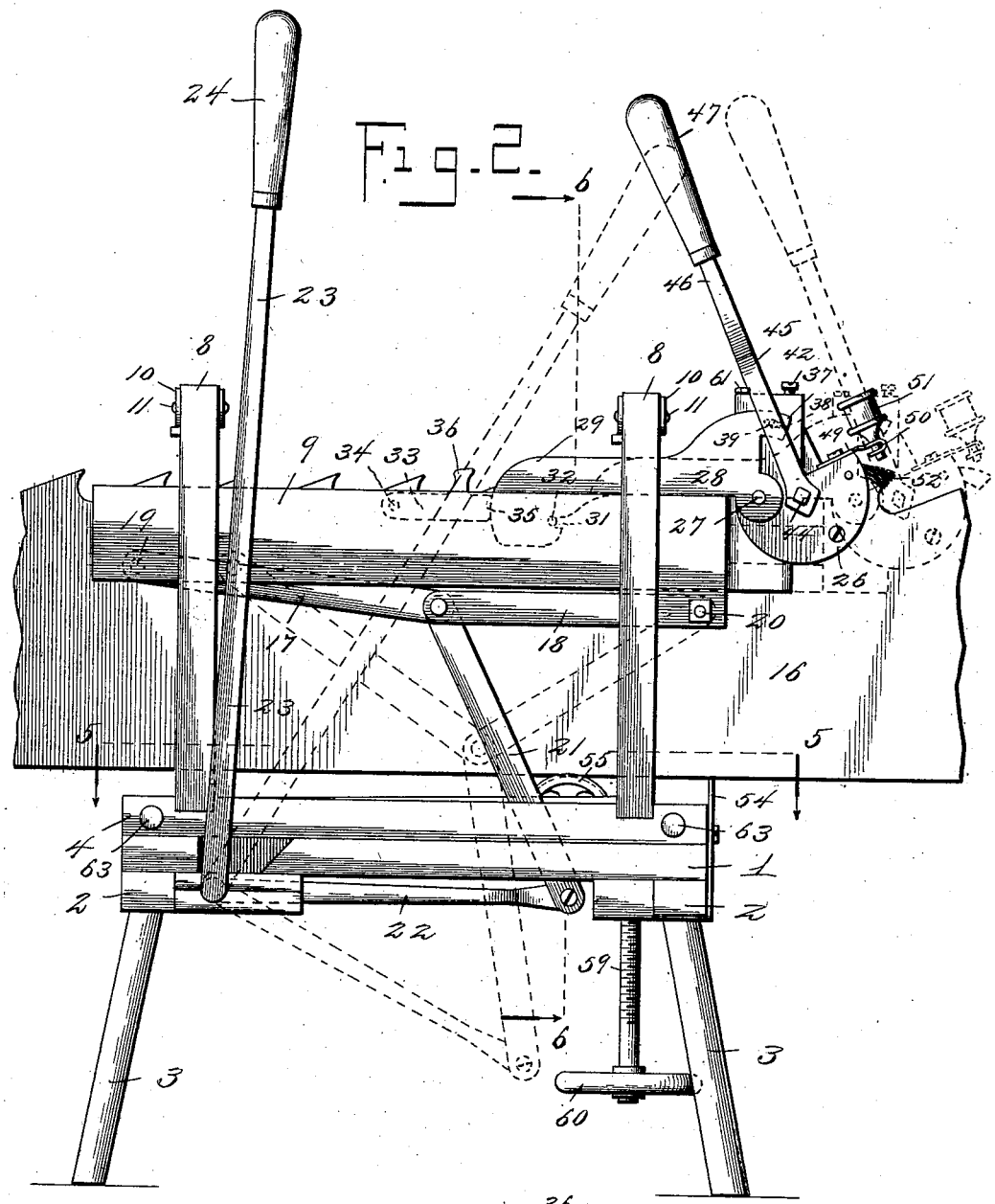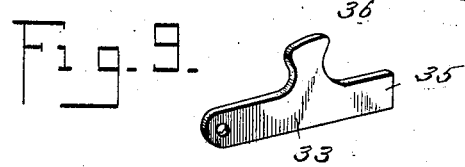

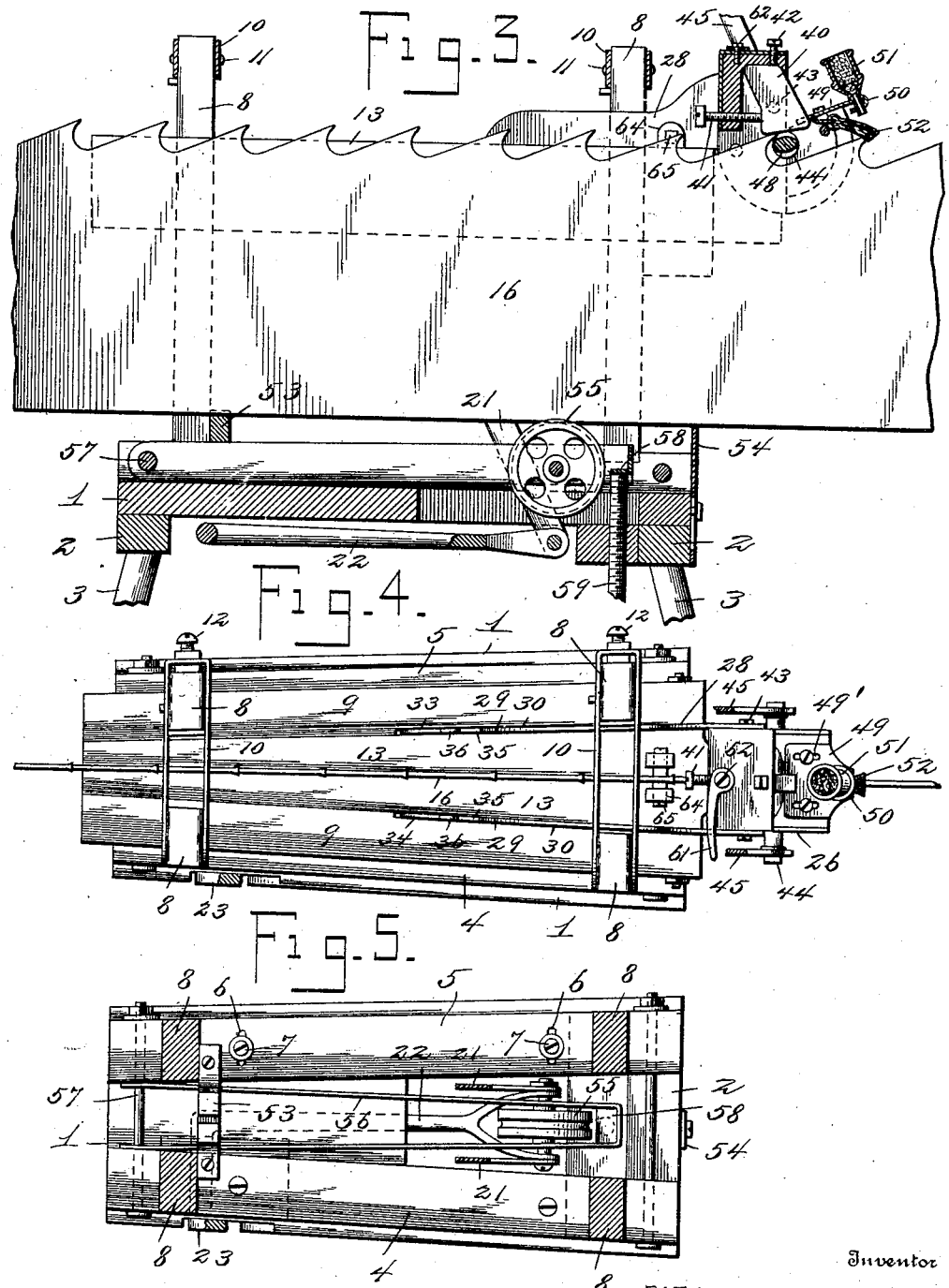

UNITED STATES PATENT OFFICE.

WILLIAM C. RENIE, OF HOQUIAM, WASHINGTON, ASSIGNOR OF ONE-HALF TO HARRY BREWER HEWITT, OF HOQUIAM, WASHINGTON.

SAW-SWAGING MACHINE.

SPECIFICATION forming part of Letters Patent No. 762,195, dated June 7, 1904.

Application filed November 15, 1902. Serial No. 131,532. (No model.)

*To all whom it may concern:*

Be it known that I, WILLIAM C. RENIE, a citizen of the United States, residing at Hoquiam, in the county of Chehalis and State of Washington, have invented new and useful Improvements in Saw-Swaging Machines, of which the following is a specification.

This invention relates to saw-swaging machines, and particularly to that class of saw-swaging machines employed in connection with band-saws.

The object of the invention is to provide a simple, effective, and reliable hand-operated machine which will swage the saw-teeth, side dress the teeth, and also lubricate the same, a single operation or movement of one of the levers of the machine serving to simultaneously clamp the band-saw, side dress the teeth, and also oil the same.

A further object of the invention is to construct the machine so that any portion of the band-saw may be introduced laterally between the clamping-jaws, thus adapting the machine to band-saws of the endless type as well as those having their ends not coupled together.

The swages in use to-day only clamp or engage one tooth at a time, taking hold of the tooth about one-half or three-quarters of an inch below the point of the tooth with two screw-clamps, the points of which are corrugated in order to grasp the saw-tooth firmly. With this style of swage it is necessary to compress the saw-teeth very severely, and in so doing the teeth are abrased to a considerable extent by the corrugations on the ends of the points which grasp the teeth. The effect of this abrasion of the metal is to crystallize it, so that when the tooth is worn down to the point where the abrasion takes place the points of the teeth crumble or break off. In my invention the jaws take hold of several teeth and a portion of the blade below the throat of the teeth, thus absolutely preventing any abrasion or crystallization of the saw-blade, which enables a saw to be used down to its minimum width without experiencing any difficulty with the points of the teeth crumbling or breaking off.

The machine hereinafter described requires no adjustment to adapt it to saws of varying gages and differently-spaced teeth, but means are employed for adjusting the angle of presentation of the swaging-die and anvil.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a perspective view of a band-saw-swaging machine constructed in accordance with the present invention, showing a section of a band-saw clamped in position in the machine. Fig. 2 is a side elevation of the same, illustrating by dotted lines the movements of the swaging-head and its supporting-arms and the operative parts connected therewith. Fig. 3 is a vertical longitudinal section through the machine. Fig. 4 is a plan view of the machine. Fig. 5 is a sectional plan view of the machine, taken on the line 5 5 of Fig. 2, showing the saw raised and the means providing for the lateral adjustment of the side bars of the frame. Fig. 6 is a vertical transverse section on the line 6 6 of Fig. 2. Fig. 7 is an enlarged detail side elevation of the swaging-head, lever, and supports. Fig. 8 is a vertical longitudinal section through the same. Fig. 9 is a detail perspective view of one of keepers.

Similar numerals of reference designate corresponding parts in all the figures of the drawings.

The saw-swaging machine contemplated in this invention is particularly designed for swaging the teeth of band-saws, and comprises a base-frame consisting of rigidly-connected longitudinal and cross bars 1 and 2, respectively, supported at a suitable elevation by means of legs 3. Surmounting one of the longitudinal bars 1 is a stationary longitudinal beam 4, while surmounting the other longitudinal bar 1 is a laterally-adjustable beam 5, provided with slots 6, which receive the fastening-bolts 7 and admit of a sufficient amount of lateral adjustment of the beam 5 to accommodate the machine to saws of widely-different gages.

Extending upward from the beams 4 and 5 are standards or corner-posts 8, which are connected by upper longitudinal bars 9 and also by means of pivoted yokes 10, the yokes being pivotally connected at 11 to the standards at one side of the machine and adapted to brace the other standards, as shown in Fig. 6, each yoke being provided with a set-screw 12, by means of which the distance between the upper ends of the standards may be accurately adjusted, the said set-screws passing through the end portions of the yokes and bearing against the standards embraced thereby. The upper longitudinal side bars 9 form the supports and guides for a pair of wedge-shaped jaws or saw-blade clamps 13, which are adapted to slide lengthwise of the machine and be reciprocated back and forth by means hereinafter particularly described. The side bars 9 and jaws 13 have a dovetailed engagement with each other, each of the jaws 13 being by preference provided with a dovetailed rib or projection 14, which is received in a corresponding recess 15 in the contiguous surface of the side bar. The arrangement of ribs and recesses may, however, be reversed by placing the dovetailed ribs on the side bars and recessing or grooving the jaws 13 to receive the same.

The jaws or clamps 13 are adapted to clamp the saw-blade 16 between them, as best illustrated in Figs. 1, 4, and 6, the saw-blade being automatically clamped and released by a simultaneous movement of the clamps lengthwise of the machine. In order to simultaneously and equally move the wedge-shaped sliding clamps 13, I connect each clamp with the stationary machine-frame by means of a pair or set of toggle-arms 17 and 18, the arms 17 being terminally and pivotally connected to the rear end portions of the jaws 13 at the point 19, while the arms 18 are terminally and pivotally connected to the machine-frame at 20. The meeting ends of the toggle-arms 17 and 18 are pivotally connected with each other and with one end of the link 21, which connects pivotally at its lower end to the extremity of a lever-arm 22, connected with a saw clamping and feeding lever 23, fulcrumed in a bearing-block 22ª, mounted upon one of the longitudinal bars 1 and provided with a suitable operating-handle 24. The lever 23 extends upward at one side of the machine, so as to be conveniently operated by an attendant. It will be understood that two sets of toggle-arms 17 and 18 and links 21 are employed, one set at each side of the machine, both links being connected with the lever-arm 22. Therefore both clamping-jaws 13 are simultaneously and equally advanced and retracted for clamping and releasing the saw-blade.

26 designates the swaging-head, which is carried by the jaws 13. The head 26 is pivotally mounted at 27 in the projecting ends of a pair of swinging supports 28, which extend backward a suitable distance and have their rear end portions 29 received in shallow recesses 30 in the outer surfaces of the jaws 13, as shown in Fig. 6, said supports being notched, as shown at 31, to engage pins 32, arranged in the recesses 30. The hooked and notched rear end portions 29 of the supports 28 are thus pivotally connected with the jaws 13, so as to allow the pivoted ends of said supports carrying the swaging-head to rise and fall. In this way as the sliding jaws are moved outward to release the saw the swaging-die carried by the swaging-head can be moved to ride over the teeth of the saw and successively engage the same and be brought automatically into proper swaging position. When the jaws reach the limit of their outward movement, the swaging-head will assume a position with the swaging-pin in the recess between two of the teeth, and when the jaws are closed to clamp the saw their forward movement will carry the head forward, which through its engagement with the teeth of the saw will pull the saw forward to be operated upon, the operation of the swage in feeding the saw being clearly illustrated in Fig. 2 of the drawings. Disengagement between the supports 28 and the jaws 13 is prevented by means of a pair of keepers 33, arranged in recesses in the jaws beyond the end portions 29 of the supports 28, each of said keepers 33 being pivotally mounted at 34, provided with a shoulder 35 to engage the adjacent support 28, and also having an operating handle or projection 36.

The swinging supports 28 are provided with arc-shaped extensions 37, having slots 38 to receive screws or fasteners 39, which pass through the slots 38 into the upwardly-extending portion of the swaging-head 26, thereby providing for relative adjustment between the swaging-head 26 and the supports 28 in order to vary the angle of presentation of the swaging-die and anvil hereinafter described. The swaging-head is substantially L-shaped and is provided with a central recess for the reception of the anvil 40. This anvil is supported at the rear by means of an adjusting-screw 41, at the top by means of another adjusting-screw 42, and at the side by means of a third adjusting-screw 43. By means of the screws 41, 42, and 43 the anvil may be adjusted forward and backward, up or down, and laterally in either direction until it has been brought to the proper swaging position for the teeth to be operated upon. The swaging-die is in the form of a pin 44, which passes horizontally through the swaging-head from side to side and has its extremities connected with the branches 45 of the bifurcated shank 46 of a swaging handle or lever 47. By bifurcating the shank of the swaging-lever the strain is equally divided upon the opposite ends of the swaging-pin 44. The central portion of the pin, or that portion which acts as a die, is slightly flattened or recessed, as shown at 48, and as the lever 47 is turned such flattened or recessed portion of the die is brought into contact with the lower side of the tooth, compressing and expanding the tooth against the anvil 40 and effecting the proper swaging thereof.

Connected with the forward projecting portion of the swaging-head is a bracket 49, having a recurved and apertured end portion 50 for the reception of the discharge nozzle or spout of an oil-cup 51. Immediately beneath the discharge end of the cup 51 is arranged a brush or spreader 52, which moves in contact with the saw-teeth as the sliding jaws 13 are reciprocated, thus spreading the oil or other lubricant upon the teeth. The bracket 49 is provided with slots 49', which receive suitable fasteners connected with the swaging-head, thus providing for the necessary adjustment of the lubricating device to position the spreading-brush properly with relation to the saw-teeth.

53 and 54 represent saw guides or rests arranged at or near the opposite ends of the machine, one of the guides, as 54, being in the form of a slotted and vertically-adjustable plate, by means of which the saw-blade may be adjusted vertically to bring the teeth into proper relation to the swaging-die and anvil. The saw-blade is also supported upon a grooved roller 55, which is journaled in a saw-rest frame 56, pivotally connected at one end at 57 to the machine-frame and provided at its opposite end with an abutment or shoulder 58, which rests upon the upper extremity of the adjusting-screw 59, provided with a hand-wheel or head 60. By turning said screw the saw-blade may be raised or lowered with accuracy until the swaging-die and anvil are brought into proper relation to the saw-teeth, after which the rest 54 may be adjusted to form a permanent gage for the saw-blade.

The limit of the movement of the swaging-lever 46 may be fixed by means of a stop 61, adjustably mounted at 62 on the top of the swaging-head 26.

63 represents bolts extending transversely of the frame and connecting the beams 4 and 5 to prevent the same from spreading under the action of the saw-clamps. These bolts also assist in the lateral adjusting and securing of the beam 5.

Each of the sliding clamps 13 is provided at a suitable point and preferably near the wider end with a holder 64, in which is received a side-dresser 65 in the form of a steel pin. The side-dressers 65 are arranged exactly opposite each other, and as the wedge-shaped jaws close together upon the saw-blade said side-dressers operate by compression upon the teeth and serve to properly aline the same.

From the foregoing description it will be understood that by operating the saw clamping and feeding lever 23 the sliding clamps 13, together with the swaging-head carried thereby, are advanced along the saw-blade, the saw-blade being automatically released as the jaws move apart laterally and the swaging-head riding over one or more saw-teeth, according to the amount of movement of the lever, so as to throw the swaging-die pin into engagement with the next or the desired saw-tooth. Then as the lever is thrown back or moved in the opposite direction the swaging-pin engages the saw-tooth, directing the saw-blade along with the jaws. As the jaws approach the inward or rearward limit of their movement they firmly grasp and clasp the saw-blade between them, thus firmly holding the blade while the operator manipulates the swaging handle or lever 47. Thus a single lever operates to simultaneously advance or retract the jaws and the swaging-head and to feed the saw-blade through the machine with an intermittent movement.

A machine constructed in accordance with the present invention provides a solid foundation and means for firmly clamping the saw while being swaged, while by providing the double or bifurcated swaging-lever twisting of the teeth while being swaged is avoided. A single operating-lever serves to position the saw, clamp the same, and also to side-dress and oil the teeth. The saw-clamping jaws may be made of any suitable length and width to provide the necessary frictional hold and grasp upon the saw. By using clamps of the class described there is no danger of cutting into the saw-teeth, thereby leaving the saw smooth and enabling the filers to obtain an even smooth edge on the tooth. No adjustment is required for saws of various gages within certain limits and the swaging-head is adjustable for teeth of different angles. Another important feature resulting from a construction set forth resides in the fact that by lifting the keepers and disconnecting the swaging-head and its supporting-arms from the sliding jaws the saw-blade may be put into the frame between the jaws and from the top. The saw-blade may be removed in the same way.

I do not desire to be limited to the details of construction and arrangement hereinabove set forth, and accordingly reserve the right to change, modify, or vary the construction within the scope of the appended claims.

Having thus described the invention, what is claimed as new is—

1. A saw-swaging machine having a frame, sliding clamping-jaws, means rendered effective by the sliding movement for opening and closing the jaws, and a swaging-head carried by the jaws, said head constructed and arranged to coöperate with the jaws to advance the saw during the operation of closing the jaws.

2. A saw-swaging machine comprising a frame, sliding clamping-jaws, jaw-operating means, a swaging-head carried by the sliding jaws, swinging supports for the swaging-head having a hooked engagement with the sliding jaws, and keepers for maintaining the engagement between said supports and the sliding jaws.

3. A saw-swaging machine comprising a frame, sliding saw-clamping jaws, jaw-operating means, a swaging-head carried by the jaws, adjustable and swinging supports connected with the jaws and forming bearings for the swaging-head, an anvil a swaging-pin, a handle for operating said pin, and an adjustable stop mounted on the swaging-head and adapted to coöperate with the swaging-handle.

4. A saw-swaging machine comprising a frame, sliding saw-clamping jaws, arms pivoted to the jaws and a swaging-head carried by the arms.

5. A saw-swaging machine comprising a frame, sliding saw-clamping jaws, arms pivoted to the jaws, and a swaging-head pivotally connected to the arms.

6. A saw-swaging machine comprising a frame, sliding saw-clamping jaws, arms pivoted to the jaws, a swaging-head adjustably mounted on the arms, and means to secure the head in adjusted position.

7. A saw-swaging machine comprising a frame, sliding saw-clamping jaws, arms pivoted to the jaws, a swaging-head pivoted to the arms, and means to adjust the head on its pivot.

In testimony whereof I affix my signature in presence of two witnesses.

WILLIAM C. RENIE.

Witnesses:
D. R. JONES,
W. JENSEN.